Jan. 8, 1963   R. G. SARGEANT   3,072,490
METHOD OF PRODUCING HIGH DENSITY LOW
VISCOSITY CITRUS JUICE CONCENTRATE
Filed Sept. 22, 1959   2 Sheets-Sheet 1

INVENTOR
RALPH G. SARGEANT
BY J. Hanson Boyden,
ATTORNEY

Jan. 8, 1963 R. G. SARGEANT 3,072,490
METHOD OF PRODUCING HIGH DENSITY LOW
VISCOSITY CITRUS JUICE CONCENTRATE
Filed Sept. 22, 1959 2 Sheets-Sheet 2
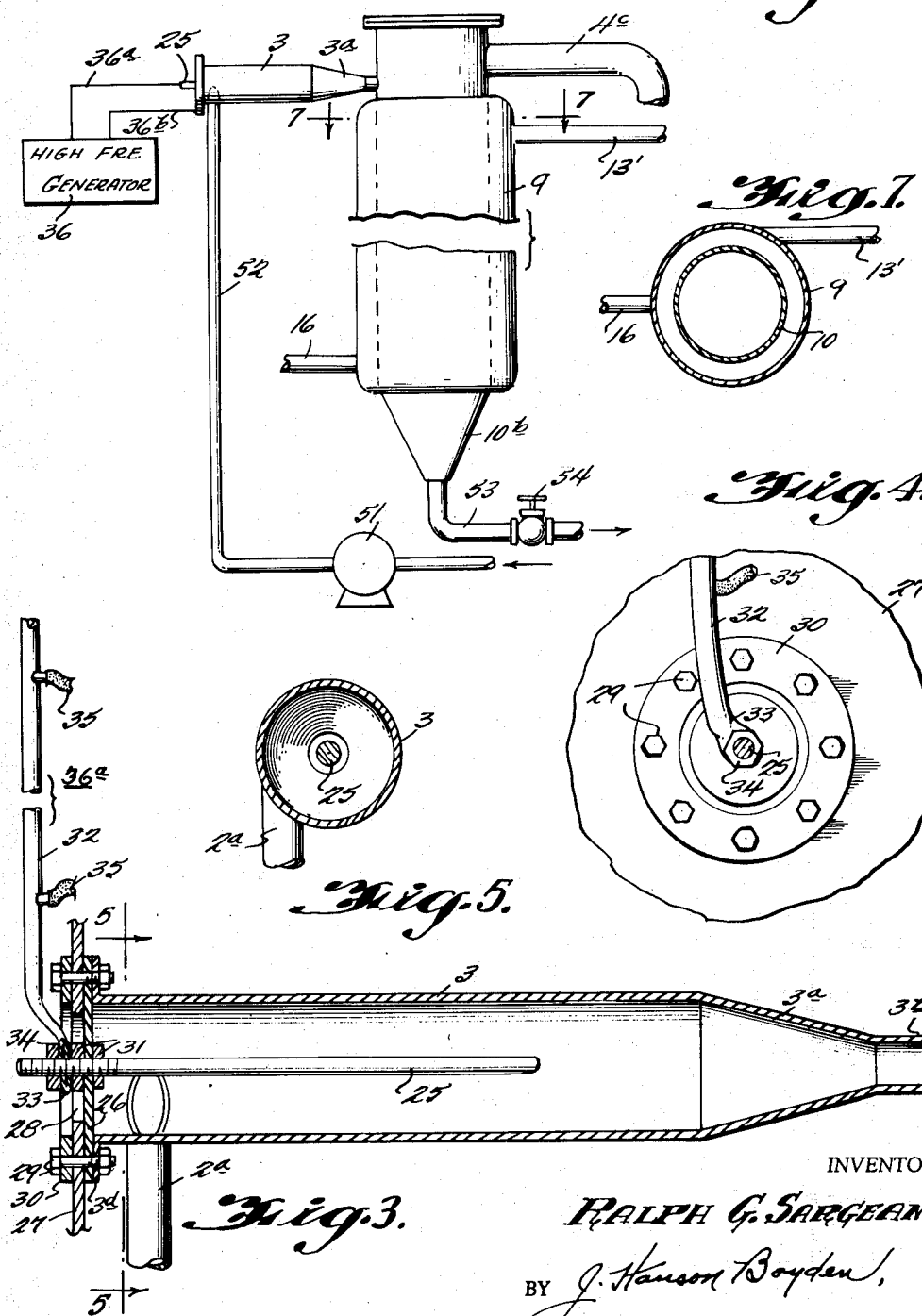
INVENTOR
RALPH G. SARGEANT
BY J. Hanson Boyden
ATTORNEY

United States Patent Office 3,072,490
Patented Jan. 8, 1963

3,072,490
METHOD OF PRODUCING HIGH DENSITY LOW VISCOSITY CITRUS JUICE CONCENTRATE
Ralph G. Sargeant, 408 W. Windsor St., Lakeland, Fla.
Filed Sept. 22, 1959, Ser. No. 841,478
8 Claims. (Cl. 99—205)

This invention relates to a method of and apparatus for removing water by evaporation from liquid mixtures containing water and other components. It is particularly advantageous for use with heat sensitive liquid materials.

As examples of processes to which the invention is applicable may be mentioned the concentration of fruit juices, such as citrus juices, and the removal from hydrocarbon and other oils and liquid fuels of any water which may have become mixed therewith.

The present application is a continuation-in-part of my prior, co-pending application Ser. No. 482,056, filed January 17, 1955, which application itself was a continuation-in-part of prior application Ser. No. 430,048, filed May 17, 1954, both of which are now abandoned.

As set forth in said prior applications, the present invention is based on the use of so-called "dielectric heating," that is to say, the application to the liquid being treated of very high frequency electric oscillations, having a frequency, for example, on the order of 10 to 20 megacycles, more or less.

The invention will first be discussed in connection with the productoin of concentrated fruit juices, such as orange juice, since this presents special problems.

The standard commercial practice at present is as described in Patent No. 2,453,109, MacDowell et al., namely the packaging of a "four fold" concentrate having a density of about 42° Brix. This is produced by first running the density up to 55° to 65° Brix and then diluting the concentrate with fresh juice to bring the density down to 42° Brix. The addition of fresh juice is necessary to restore the taste and flavor of the product to a degree at which it is acceptable to the public, the original flavor having been damaged by the evaporating process.

Commercially, the juice is evaporated by means of steam evaporators, which are similar in construction to water-tube boilers. The vertical tubes are surrounded by hot steam, and the juice flows by gravity down the tubes, under a partial vacuum. The evaporation of the water depends upon the conduction of heat by the juice itself. No matter how high the vacuum, or how carefully the temperature is regulated, parts of the juice are overheated, caramelized, or given a "cooked" off flavor. This is due to the fact that the walls of the steam heated tubes are too hot, and although the juice may flow along the tubes in the form of a film, the portions of this film in actual contact with the hot walls of the tube become overheated.

The steam evaporators are also objectionable for another reason. The juice contains pectin, and when this is heated beyond a critical temperature the viscosity of the juice is greatly increased. Instances have been known in which the viscosity became so high that the liquid tended to form gum or "candy" and clog the tubes. And when packed and chilled, such juice tends to jellify in the cans, so that it will not readily combine with the water that is added to reconstitute the juice for consumption. And when re-constituted, the solids tend to separate out from the liquid vehicle, upon standing.

As above stated, a density of 42° Brix yields what is called a "four fold" concentrate. A density of 72° Brix would yield an "eight fold" concentrate, which would be highly desirable. Such a high concentrate would have many advantages. It would admit of the addition of a larger amount of fresh juice to bring it down to the standard 42° Brix, if desired, for packing. Or it could be packed in the retail cans at 65° or 72° Brix, thus enabling the purchaser to obtain twice as much re-constituted juice. Or again, it could be packed in bulk, in large cans or drums, and sold to canners, who might reduce it to 42° Brix and pack it for the retail trade. This would be especially advantageous for export to foreign countries, since it would result in a big saving in freight costs. Moreover, while the 42° Brix concentrate has to be stored at a temperature close to zero, the 65° Brix concentrate will stand storage temperatures as high as 20° to 30° F. without deterioration.

But, for the reasons hereinbefore set forth, it has never been possible, so far as I am aware, to produce a satisfactory 65° Brix concentrate by means of steam evaporators of any kind.

One object of the present invention is, therefore, to produce a high density concentrate which shall be free from any "cooked" or off flavor, and without any caramelization.

Another object is to produce a concentrate of very low viscosity, which will not jellify in the cans, and which, when re-constituted by the addition of water, will not separate, on standing.

Still another object of the invention is to produce a concentrate of a density of at least 65° Brix, which does not require the addition of fresh juice, but which, when reconstituted by the addition of water, will yield a drink of acceptable taste and flavor.

I achieve the foregoing objects by applying to the juice being concentrated very high frequency electric oscillations, and an additional object is to devise special apparatus by means of which these oscillations may be effectively applied. This special apparatus includes a novel form of electrode, and is useful not only in concentrating fruit juices, but also in evaporating water from any liquid mixture from which it is desired to remove the water.

It is believed that such high frequency oscillations set up electric currents which traverse the liquid materials being treated, and which, in some cases at least, generate heat within these materials.

The rate at which heat is thus generated depends upon the "loss factor," a factor which is directly proportional to what is known as the "dielectric constant" of the material. Dielectric constants vary from 1 to 8, for most materials ordinarily associated with water, but water has a dielectric constant of about 80. Thus the dielectric constant of water is from ten to eighty times greater than that of any other material with which water is usually mixed, and therefore water, when subjected to a high frequency field, heats at a much more rapid rate than any other such substance or material.

The action of such high frequency oscillations or field on liquid mixtures is not entirely understood, but it seems probable that in some cases, instead of or in addition to the selective heating effect, the oscillations produce other selective effects on the different components, possibly related to the above mentioned "dielectric constant" of each particular material.

A still further object of the invention is to increase the efficiency of methods of concentrating citrus juices by first separating the water containing portion of the juice from the remaining portion, concentrating only the water-containing portion and then mixing the concentrated, water-containing portion with said remaining portion to constitute a concentrated juice.

The evaporating chamber which I employ is, as usual, operated under a high vacuum, and a feature of the invention resides in surrounding the evaporating chamber with a jacket through which warm (not hot) water is caused to circulate, to maintain the desired temperature of the liquid being treated. The necessary vacuum may conveniently be produced by means of steam-operated air ejectors, associated with a condenser, and it is yet another object of the invention to utilize the cooling water from such a condenser as a source of the warm water for the said evaporating chamber jacket. By this means the amount of electrical energy required is reduced.

With the above and other objects in view, and to improve generally on the details of such apparatus, the invention consists in the method hereinafter described and claimed, and illustrated in the accompanying drawings, forming part of this specification, and in which:

FIG. 3 is a vertical longitudinal section on an enlarged scale through my improved electrode structure;

FIG. 4 is an end elevation of the apparatus shown in FIG. 3, looking from the left;

FIG. 5 is a transverse section substantially on the line 5—5 of FIG. 3, looking in the direction of the arrows;

FIG. 6 is a side elevation of a modified arrangement of electrode and evaporating chamber, parts being broken away; and FIG. 7 is a horizontal section substantially on the line 7—7 of FIG. 6, looking in the direction of the arrows.

Although satisfactory results can be and have been obtained by concentrating the whole juice, it is advantageous in some cases to separate the juice by means of a suitable centrifuge, into two components, one comprising the water-containing portion and the other the so-called ester-carrying portion, and to concentrate only the water-containing component.

This water-containing component constitutes approximately eighty percent of the entire juice, and contains most of the acids and sugars present in the juice. The other twenty percent contains the lipids, cellulose, pectin complexes and pigments (anthocyanides).

In the commercial preparation of orange juice, the material, after having been crushed or disintegrated, is usually passed through what is known as a "juice finisher," the purpose of which is to separate the juice from the seeds pulp, etc.

Figure 1:
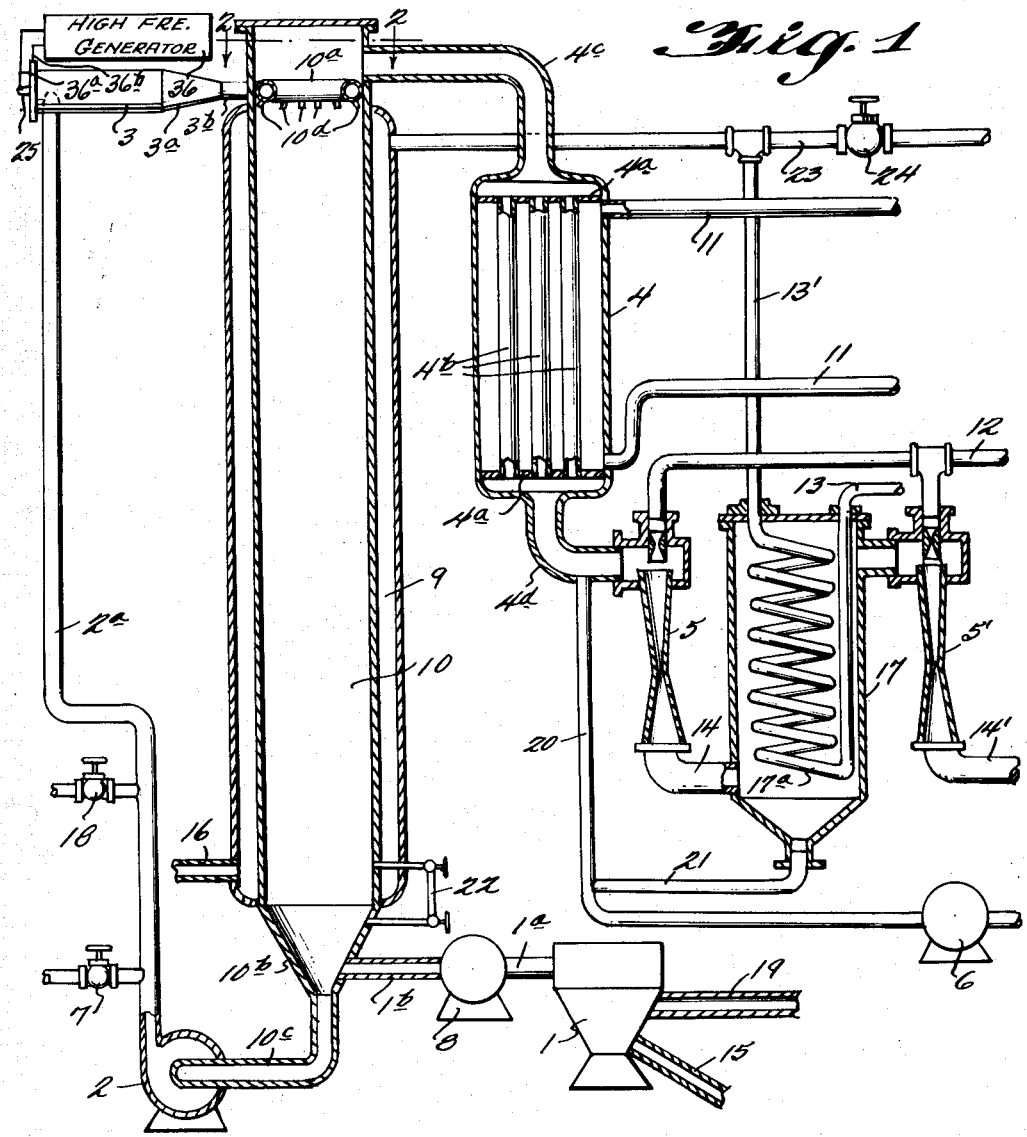
FIG. 1 is a schematic view of the essential equipment used in carrying out one form of the invention.

Referring to the drawings in detail, and more especially first to FIG. 1, the juice from the finisher is fed into the centrifuge 1 through pipe 19. The water-containing portion is delivered from the centrifuge through pipe 1ª to a suitable pump 8, from which it is delivered through a pipe 1ᵇ to the conical bottom 10ᵇ of an evaporating chamber 10.

From the lower end of the conical bottom 10ᵇ extends a pipe 10ᶜ to a centrifugal pump 2 which forces the liquid material up through a vertical pipe 2ª to the top of the evaporating chamber 10 where it is delivered to a spray head 10ª which directs the material into contact with the vertical walls of the evaporating chamber. The material then flows down these walls to the conical bottom 10ᵇ where it is again recirculated or recycled by the pump 2.

Figure 2:
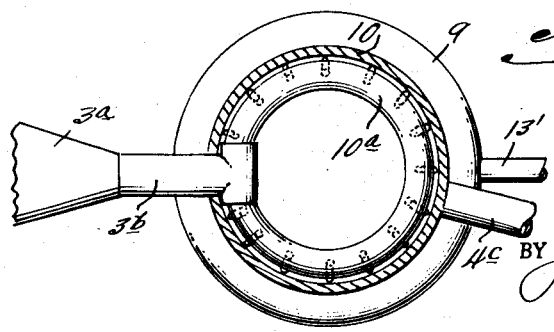
FIG. 2 is a sectional plan view on an enlarged scale substantially on the line 2—2 of FIG. 1.

The preferred construction of the spray head is best shown in FIG. 2. It consists of an annular or ring-shaped pipe having a series of nozzles 10ᵈ projecting outwardly and downwardly from its lower side, so as to spray the liquid against the walls of the chamber.

Interposed in the pipe 2ª is a dielectric heating device or electrode structure 3 through which the liquids circulate. The details of the preferred form of this device are shown in FIGS. 3 to 5. It consists of a horizontally disposed cylindrical casing or shell having a restricted or tapering end 3ª, discharging axially of the casing into a pipe 3ᵇ connected with the spray head 10ª. Mounted at the other end of the cylindrical structure and extending axially thereof is a central electrode in the form of a rod 25, so that an annular space is provided between this rod and the cylindrical shell. This central electrode, which is shorter than the cylindrical shell, is supported wholly at one end, the other end, adjacent the discharge opening of the shell, being free. The pipe 2ª, which feeds the liquid into the electrode structure, is arranged to deliver the same tangentially into the cylindrical shell adjacent the end at which the electrode rod is mounted, so that the liquid tends to whirl around the annular space as it travels toward the discharge end of the shell. This whirling or spiral movement of the liquid tends to prevent deposits on the inner surface of the cylindrical shell and keep such surface clean. Furthermore, it may be desirable in some cases to apply to the surface a protective coating of some suitable material such as a silicone, to prevent adhesion.

The inner electrode or rod is supported by a disc 26 of insulating material, to which it is clamped by means of nuts 31, and the disc itself may conveniently be supported on the wall 27 of a suitable housing having an opening 28. The end of the cylindrical shell or outer electrode is shown as flanged at 3ᵈ, and this flange is secured to the wall 27 by means of bolts 29 passing through the flange, the wall 27, and a clamping ring 30. The central electrode is connected with one terminal of a suitable high-frequency generator by means of a conductor 32, secured to the threaded end of the rod 25 by means of a nut 34. Preferably, and as shown, this conductor is in the form of a copper tube, having its end flattened and perforated as at 33, for attachment to the electrode rod, and cooled by water circulating therethrough by means of hose connections 35. Owing to the "skin effect" of high frequency currents, the electrical energy is carried mostly on the surface of the electrode rod 25, and it is advantageous to have this rod, which may be of stainless steel, plated with a good conducting, non-corrosive metal such as silver.

In use, the electrode structure is connected with the two sides of a high-frequency generator 36, one side being connected through a well insulated lead 36ª with the central rod 25, and the other side connected by lead 36ᵇ with the electrode shell or casing, which is grounded. Preferably, and as usual in the art, such connection is made by means of a co-axial cable.

The ester-carrying components of the juice are discharged from the centrifuge 1 through the pipe 15 to a suitably refrigerated storage tank, where they are held in storage until the water-carrying component which is being recirculated through the evaporating chamber as above described has reached the desired concentration. Samples of the product can be withdrawn from time to time through spigot 18 for testing, to determine when the desired concentration has been reached. This concentrated component is then withdrawn through valve 7 and recombined with the stored ester-carrying component to produce the desired final product.

By thus separating the juice into two components and evaporating only one of these components, a very substantial saving in power results, and the time cycle is also greatly reduced. Furthermore, the ester-carrying components of the juice are not exposed to any heat whatever and consequently the natural flavor is preserved.

From the top of the evaporating chamber 10 extends a pipe 4ᶜ to a condenser 4 of any suitable type, shown as a shell and tube condenser having tube sheets or bulk heads 4ª adjacent each end, between which extend tubes 4ᵇ.

A pipe 4ᵈ extends from the bottom of the condenser 4 to a steam-operated air ejector 5, supplied with steam through a pipe 12. This ejector draws the vapors from the evaporating chamber down through the tubes of the condenser 4, and the steam and vapors are delivered from the ejector 5 through a pipe 14 into an intercondenser 17. A second air ejector 5' draws the uncondensed steam and vapors from the condenser 17 and discharges through pipe 14' to atmosphere.

To eliminate the costly construction required with a barometric condenser such as is commonly used for this purpose, I employ a surface-type condenser, containing a coil 17ᵃ. Water is fed to one end of this coil by a pipe 13, and from the other end extends a pipe 13′ to a jacket 9 which surrounds the evaporating chamber 10. Thus the water which is heated in the coil 17ᵃ by the steam and vapors from the air ejector 5 is utilized to transfer this heat to the walls of the evaporating chamber 10. As the liquid material flows down inside of these walls, it is maintained at a relatively warm temperature by the water jacket 9 and prevented from cooling off substantially as it otherwise would do. A pipe 23, controlled by a valve 24, is connected with pipe 13′, and through this pipe 23 cold water may be admitted to regulate the temperature of the jacket 9 as desired.

By way of example, it may be stated that by means of the air ejector above described, a vacuum is maintained on the evaporating chamber to an extent of at least 29½ inches, so that the water contained in the liquid mixture being treated evaporates at about 70° F., and the temperature of the water jacket 9 is such that the temperature of the liquid being evaporated as it flows down the walls of the chamber 10 does not fall substantially below 75° F. By virtue of utilizing the heat from the condenser 17 by means of this water jacket 9, the amount of power required to be delivered to the electrode structure 3 is greatly reduced, thus effecting a substantial economy. In practice, the level of the liquid being treated in the evaporating chamber is maintained approximately at the upper end of the conical bottom 10ᵇ, thus permitting the liquid to flow down the entire length of the water-jacketed walls. In order to observe the level of the liquid in the evaporating chamber, a sight glass 22 is preferably provided adjacent the bottom thereof.

A suitable refrigerating medium such as "Freon" gas is supplied to the condenser 4 by pipes 11, from a suitable compressor, in a well-known manner, this apparatus being so designed as to maintain the condenser 4 at a temperature of approximately 50° F. Thus the vapors coming off through pipe 4c are mostly condensed, and the condensate flows out from the bottom of the condenser through pipe 20 to a pump 6. A pipe 21 from the bottom of condenser 17 delivers additional condensate into the pipe 20.

Water fed into the condenser coil 17ᵃ may be derived from any suitable source, but a further economy may be achieved by utilizing water from the condenser of the compressor supplying the refrigerating medium to condenser 4, as above described. Thus, water may be caused to flow continuously first through the compressor condensor and then through the coil 17ᵃ to the jacket 9, from which it escapes through pipe 16. This water absorbs heat from the compressor condenser and is somewhat warm when it enters the coil 17ᵃ. It is then further heated by the steam from ejector 5, before passing on to the water jacket.

While I have shown and described a centrifuge for separating the fresh juice into two components, only one of which is subjected to evaporation, it will of course be understood that the separating step may be omitted if desired and the whole juice concentrated by means of my improved evaporator system. This has been done successfully, with the results described in detail hereinafter.

Where the whole juice is evaporated, my improved method has a special advantage in connection with the pectin present in the juice. By operating at a very low temperature and under a high vacuum, no portion of the juice is heated to a point high enough to cause the pectin, when the juice is cooled, to tend to jell. This avoidance of jellification may be due, as above stated, to the fact that the temperature of all portions of the juice is maintained below the critical temperature at which the pectin is caused to jell, or it may be that the high frequency electrical energy to which the juice is subjected has some effect on the pectin, or may break down or change the character of the enzymes present. In any event, the fact is that juice evaporated and concentrated in accordance with my improved method shows no tendency to jellify when cooled, and, when reconstituted by mixing with water, shows no tendency to separate. This in itself is a novel and important achievement.

Referring again to FIG. 1, the pipe 2ᵃ is slightly larger than the restricted outlet 3ᵇ discharging the juice from the electrode structure, so that the pump 2 tends to generate a substantial pressure within the electrode structure. Thus the high frequency electrical energy is applied to the juice while it is under pressure.

Furthermore, the sum total of the areas of the spray nozzles 10ᵈ is preferably somewhat greater than the cross sectional area of the restricted discharge 3ᵇ, with the result that the pressure in the spray head 10ᵃ is somewhat less than in the electrode structure.

The high frequency generator 36 which I employ is of the well known type embodying one or more oscillating thermionic tubes. The exact frequency is not critical, but should be what is known as radio frequency. For example, a frequency of 60 cycles per second, such as ordinary house current, would not be high enough to produce the desired results. Furthermore, with such a low frequency current electrolysis is likely to occur at the inner electrode. It is thought that a frequency of anywhere within the range of 1 to 25 or more megacycles will operate satisfactorily. In practice, I have usually employed a frequency on the order of 15 to 20 megacycles. In any event, the important thing is that the electrode structure be so proportioned as to be electrically resonant to the frequency employed.

The juice passing through the electrode structure 3 is usually heated. The difference in temperature of the juice entering and leaving the electrode structure is referred to as the temperature differential. The apparatus has been operated with a temperature differential as high as 40° F., and again it has been operated with a very small temperature differential of not more than one or two degrees F. A temperature differential of 5° to 10° F. gives satisfactory results.

The temperature differential depends, of course, on the rate of flow of the juice through the electrode structure and on the amount of electrical energy supplied by the generator. Apparently the lower the temperature differential, the better the product obtained.

If, as has been done successfully, the temperature differential is held at near zero, such, for example, as 1° or 2°, then there is practically no sensible heating of the juice as it passes through the electrode structure. In this case, the electrode structure, to which the high frequency current is supplied, cannot well be described as a heating means. The high frequency energy may have some effect other than heating. For example, the high frequency electrical energy may operate to produce a separation of the water particles or molecules from the other components. It is not known with certainty just what effect the high frequency energy has on the liquid mixture, but the fact is that the application of such high frequency energy to the liquid mixture produces the results described herein.

A vacuum of at least 29″ to 29½″ of mercury is maintained in the evaporating chamber 10 and the water in the jacket 9 is regulated so as to keep the temperature of this chamber at around 75° F. When the liquid mixture is sprayed into this chamber through the spray nozzles 10ᵈ the water present immediately flashes into steam or vapor which is drawn off through the conduit 4c. As the water vaporizes, it absorbs a large amount of heat and the water jacket 9 is necessary to supply this so-called latent heat of vaporization. Otherwise, the liquid would tend to freeze in the evaporating chamber.

It will be understood that the electrode structure, when operating, is not hot to the touch, and that, when the rate of flow is such as to maintain only a small temperature differential between the inlet and discharge ends, it is difficult to detect any sensible heating. In hot weather, the juice is preferably first refrigerated or cooled, so that it comes into the electrode structure at a temperature no higher than 60° to 65° F. If then it is heated 5° to 10° F. by the electrical energy, it is discharged into the vacuum chamber at 65° to 75° F., at which temperature, under the high vacuum employed, the water flashes into vapor, as above mentioned. This temperature of not over 80° F. is of course not high enough to sterilize the product. Thus the concentrate, as already mentioned, has to be stored under refrigeration.

It will be particularly noted that at no point in the cycle does the liquid come in contact with any surface hotter than 75° to 80° F. This is in sharp contrast to the temperatures of 130° to 140° F. encountered in the conventional steam evaporators.

By way of example, but in no sense as a limitation, the following figures may be given. With an electrode structure having an outside diameter of 3" to 4" and a length of 18" to 20", an inner electrode about ¾" in diameter and 12" or 14" long is employed. The pump 2 generates a hydraulic pressure of around 60 lbs. per square inch in the electrode structure and, as above described, this is reduced to about 25 lbs. per square inch at the spray head. The rate of flow through the electrode structure may be on the order of 30 gallons per minute, but of course this may be varied by controlling the speed of the pump. The amount of electrical energy supplied to the electrode structure is on the order of 9 kilowatts.

With equipment such as described in the foregoing example, it is possible to produce an orange juice concentrate having a density of as high as 80° Brix, without any caramelization or off flavor. At the same time, owing to the fact that the temperature of the juice at all points is maintained very low, the viscosity is exceptionally low.

Tests have been run, among others, with the whole juice of the pineapple variety of orange, which variety is known to contain a large amount of pectin. At a density of 65° Brix, for example, the viscosity of this concentrate at 75° F. was on the order of 2,000 to 2,500 centipoises. This compares with a very much higher viscosity for the same concentrate brought to the same density by the thermal conduction method in the conventional steam evaporator. So far as I am aware, I am the first to produce an orange juice concentrate having so high a density combined with such a low viscosity.

This result is due in part at least to the fact that the liquid is heated with absolute unformity as it passes through the electrode structure, when employing a temperature differential high enough to substantially heat the liquid.

When thus regarding my improved electrode structure as a heating device, it is apparent that the electrical energy is applied across or transversely of the mass of liquid. If the high frequency electrical energy may be regarded as a "current," this current flows radially through the annular mass of liquid, thus uniformly heating all portions thereof. In other words, the same heating effect is applied at all points throughout the mass.

It may be, that, as set forth herein, the water present in the liquid mixure heats first, and faster than the other components. This, as above explained, is due to the very high "dielectric constant" of water. So, when I say that all portions of the liquid mixture are "uniformly heated," I means that there is no zone, point, stratum or layer of the mass that is subjected to any greater heating effect than any other zone, point, stratum or layer, and use of the expression "uniformly heated" is not intended to exclude the possibility that, because of their character, some components distributed through the mass may be heated faster or more strongly than others.

This idea of "uniformly heating" all portions of the liquid is in sharp contrast to the conventional commercial systems in which steam evaporators are employed. As above mentioned, in these commercial plants, in which the liquid being treated flows through steam heated tubes, and is heated by conduction, the portions or layers of the liquid in direct contact with the hot walls of the tubes are heated to a much higher temperature than the other portions. And this is true, even though the liquid flows along the tubes in the form of a relatively thin film. It is for this reason that, in the case of citrus juice, it is impossible to avoid a certain amount of caramelization, and relatively high viscosity, as the density increases.

Another peculiar fact about the operation of my improved apparatus is that the electrical power supplied falls off as the density rises. Thus the following table shows the variation in kilowatts and in milliamps in the grid circuit of the oscillating tube as the density of the juice rose, the current in the plate circuit remaining constant.

| Density (Brix) | Kilowatts | Grid Milliamps |
| --- | --- | --- |
| 53.0 | 8.2 | 150 |
| 55.0 | 8.2 | 145 |
| 57.0 | 8.0 | 135 |
| 59.0 | 7.4 | 110 |
| 59.0 | 7.4 | 110 |
| 61.0 | 7.8 | 130 |
| 62.2 | 8.4 | 150 |
| 63.0 | 8.5 | 150 |
| 66.0 | 8.0 | 135 |
| 67.0 | 7.6 | 120 |
| 67.5 | 7.4 | 110 |
| 68.0 | 7.2 | 100 |
| 69.5 | 7.0 | 90 |
| 70.0 | 6.7 | 80 |
| 70.7 | 6.7 | 80 |
| 72.0 | 6.6 | 75 |

Another food product from which I have successfully removed water by the use of my improved method and apparatus is bananas. It has been the practice for some time for manufacturers to prepare and sell in cans a kind of banana puree, for use as a baby food, and it is considered highly desirable to remove some of the water from such a puree to concentrate it.

The puree is sufficiently fluid to be pumped through pipes, like a liquid, and by passing this material through my improved apparatus, as herein described in connection with fruit juices, I have been able to remove a sufficient amount of water to raise the density of the product at least 10° Brix. And I have accomplished this without in the least adversely affecting the taste and flavor.

In thus processing banana puree, I have maintained the temperature of the vacuum chamber at not over 65° F.

Other products containing water, and in the nature of purees or slurries, can also be concentrated by the use of the present invention, if they are capable of being pumped.

While in Fig. 1, I have shown a pump 2 for recirculating the liquid from the bottom to the top of the evaporating chamber, I find that in some cases it is possible to produce the desired results without any such recirculation. This is illustrated in Fig. 6, in which a pump 51 supplies the liquid to the electrode structure 3 and after passing through the evaporating chamber the liquid is drawn off through pipe 53 and valve 54, having been concentrated to the desired degree by passing only once through the electrode structure.

Also in this figure I have shown the pipe 13' conveying warm water to the jacket 9 as delivering into this jacket tangentially, as shown in FIG. 7. This produces a whirling motion which tends to heat the jacket more uniformly. This same idea may of course be employed in connection with Fig. 1.

The method herein disclosed of separating the juice by means of a centrifuge into two portions, evaporating only the water containing portion, and then combining this concentrated portion with the other portion, is not claimed in the present application, but this method, as well as the new product, is claimed in a co-pending application Serial Number 232,056, filed October 22, 1962, as a continuation-in-part of this application.

No claim is made herein to the details of the electrode structure itself as illustrated in FIGS. 3, 4 and 5, this subject matter being covered in another divisional application Serial Number 89,226, filed February 14, 1961 now Patent No. 3,060,297, issued October 23, 1962.

What I claim is:

1. The method of producing a low viscosity citrus juice concentrate having a density of at least 65° Brix which can be reconstituted by mixing with water alone, without addition of fresh juice, to provide a drink having a flavor essentially the same as that of the juice from which the concentrate is prepared, comprising flowing the juice as a solid confined stream under substantial hydraulic pressure; applying to the flowing juice while under such pressure high frequency electrical oscillations; then discharging the juice into a flash evaporation zone while maintaining said zone under high vacuum and at such temperature as to cause the water content of the juice to flash into vapor, all parts of the entire quantity of juice being concentrated being maintained at all times at a temperature not substantially exceeding 80° F.; and separately recovering the concentrated juice from said flash evaporation zone.

2. The method of claim 1 wherein said high frequency oscillations have a frequency in the range of 1 to 25 megacycles.

3. The method of producing a low viscosity citrus juice concentrate having a density of at least 65° Brix which can be reconstituted by mixing with water alone, without addition of fresh juice, to provide a drink having a flavor essentially the same as that of the juice from which the concentrate is prepared, comprising forcing the juice, at a temperature not substantially exceeding 65° F., into a first zone; flowing the juice through said first zone, as a solid confined stream under substantial hydraulic pressure; applying to the juice, while under such pressure, high frequency electrical oscillations of such power as to raise the temperature of the juice uniformly by more than 1° F. but less than is required to produce a temperature in the juice of 80° F.; then discharging the juice into a second zone maintained under high vacuum and at such temperature as to cause the water content of the juice to flash into vapor; and separately withdrawing the concentrated juice from said flash evaporation zone.

4. The method of claim 3 wherein the temperature of the juice is raised by 5–10° F. in said first zone.

5. The method of concentrating citrus juice which comprises causing the juice to flow in the form of a solid, confined stream under substantial hydraulic pressure through a high frequency dielectric heating device directly into a partial vacuum, regulating the amount of electrical power and the rate of flow of the juice in such manner that the temperature differential between the juice entering and leaving said heating device is maintained within a range of 2° to 20° F., and controlling the temperature and pressure of said partial vacuum so that the water present in the juice entering the same flashes into vapor.

6. In the preparation of high density citrus juice concentrates, the method of reducing any tendency of the concentrated product to jell when cooled or to separate when reconstituted by mixing with water which comprises causing the juice to flow in a confined stream along a closed path under substantial hydraulic pressure, applying to the juice while so flowing under such pressure high frequency electrical oscillations, discharging the stream at the end of such closed path into a partial vacuum and maintaining all parts of the juice at all times at a temperature not substantially in excess of 80° F.

7. The method of producing a low viscosity citrus juice concentrate having a density of at least 65° Brix which can be reconstituted by mixing with water alone, without addition of fresh juice, to provide a drink having a flavor essentially the same as that of the juice from which the concentrate is prepared, comprising flowing the juice as a solid, confined stream under substantial hydraulic pressure through an elongated treating zone, with the stream moving spirally along the zone for at least a substantial portion of its travel therethrough; applying high frequency electrical oscillations to the spirally moving juice while the juice is confined and under such pressure; flowing the treated juice from the treating zone as a smoothly travelling, confined stream and discharging the same into a flash evaporation zone while maintaining the flash evaporation zone under high vacuum and at such temperature as to cause the water content of the juice to flash into vapor, all parts of the entire quantity of juice being concentrated being maintained at all times at a temperature not substantially exceeding 80° F.; and separately recovering concentrated juice from the flash evaporation zone.

8. The method of claim 7 wherein said solid, confined stream is flowed horizontally through the treating zone.

References Cited in the file of this patent
UNITED STATES PATENTS

| | | |
|---|---|---|
| 1,577,747 | Hartman | Mar. 23, 1926 |
| 2,089,793 | Hartman | Aug. 10, 1937 |
| 2,140,011 | Hass | Dec. 13, 1938 |
| 2,450,774 | Zahm | Oct. 5, 1948 |
| 2,453,109 | MacDowell et al. | Nov. 9, 1948 |
| 2,485,660 | Robertson | Oct. 25, 1949 |
| 2,585,970 | Shaw | Feb. 19, 1952 |
| 2,750,998 | Moore | June 19, 1956 |
| 2,842,193 | Ballestra | July 8, 1958 |
| 2,856,296 | Mann et al. | Oct. 14, 1958 |